(12) United States Patent
Kirch

(10) Patent No.: US 6,324,161 B1
(45) Date of Patent: Nov. 27, 2001

(54) MULTIPLE NETWORK CONFIGURATION WITH LOCAL AND REMOTE NETWORK REDUNDANCY BY DUAL MEDIA REDIRECT

(75) Inventor: Tony M. Kirch, Carrollton, TX (US)

(73) Assignee: Alcatel USA Sourcing, L.P.

( * ) Notice: Subject to any disclaimer, the term of this patent is extended or adjusted under 35 U.S.C. 154(b) by 0 days.

(21) Appl. No.: 09/070,581

(22) Filed: Apr. 30, 1998

Related U.S. Application Data

(60) Provisional application No. 60/057,699, filed on Aug. 27, 1997.

(51) Int. Cl.[7] .................................................. H04L 12/28
(52) U.S. Cl. ..................... 370/217; 370/225; 370/228; 370/401; 709/239; 709/249
(58) Field of Search ..................................... 370/352, 353, 370/354, 389, 401, 216, 217, 218, 225, 228; 709/238, 239, 249, 250

(56) References Cited

U.S. PATENT DOCUMENTS

| | | | |
|---|---|---|---|
| 4,847,837 | 7/1989 | Morales et al. | 370/222 |
| 5,473,599 | 12/1995 | Li et al. | 370/402 |
| 5,490,252 | * 2/1996 | Macera et al. | 709/249 |
| 5,708,654 | * 1/1998 | Arndt et al. | 370/242 |
| 5,751,954 | * 5/1998 | Saito | 709/245 |
| 5,835,696 | * 11/1998 | Hess | 714/10 |
| 5,838,924 | * 11/1998 | Anderson et al. | 709/239 |
| 5,852,724 | * 12/1998 | Glenn, II et al. | 709/239 |
| 5,918,017 | * 6/1999 | Attanasio et al. | 709/224 |
| 5,949,753 | * 9/1999 | Alexander, Jr. et al. | 370/216 |
| 5,987,526 | * 11/1999 | Morales | 709/249 |
| 6,108,300 | * 8/2000 | Coile et al. | 370/217 |

FOREIGN PATENT DOCUMENTS

| | | | |
|---|---|---|---|
| 0 416 943 A2 | 3/1991 | (EP) | G06F/11/20 |
| 0 416 943 A3 | 3/1991 | (EP) | G06F/11/20 |
| 07154429 | 6/1995 | (JP) . | |

* cited by examiner

Primary Examiner—Hassan Kizou
Assistant Examiner—Saba Tsegaye
(74) Attorney, Agent, or Firm—Anderson, Levine & Lintel, LLP

(57) ABSTRACT

A communications configuration comprising a first network medium having a first IP address and a second network having a second IP address. The configuration further includes a first host station with a first interface connected to communicate with the first network medium using the first IP address and a second interface connected to communicate with the second network medium using the second IP address. The configuration further includes a third network medium having a third IP address and a fourth network having a fourth IP address. Still further, the configuration includes a first router station coupled between the first network medium and the third network medium and a second router station coupled between the second network medium and the fourth network medium. Lastly, the configuration includes a second host station. The second host station includes a first interface connected to communicate with the third network medium using the third IP address and a second interface connected to communicate with the fourth network medium using the fourth IP address. The memory of the second host station is programmed to perform various steps. A first step detects a communications failure along a first communication path including the first interface of the first host station, the first network medium, the first router station, the third network medium, and the first interface of the second host station. A second step, responsive to the detected failure, redirects communications addressed to pass along a second communication path from the second host station to the first host station such that redirected communications are not attempted by the second host station to the first host station along the first communication path.

36 Claims, 6 Drawing Sheets

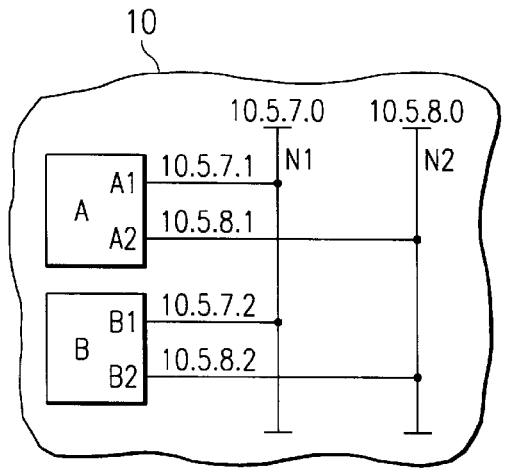
FIG. 1a
(PRIOR ART)
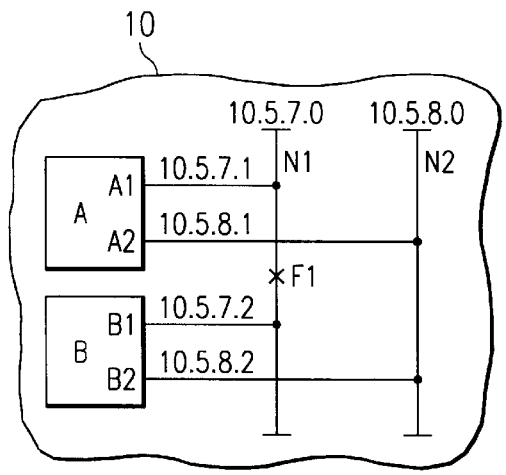
FIG. 1b
(PRIOR ART)
NODE A ROUTE TABLE
10.5.7.0 USE A1 (10.5.7.1)
10.5.8.0 USE A2 (10.5.8.1)
FIG. 2a
(PRIOR ART)
NODE A ROUTE TABLE
10.5.7.2 USE A2 (10.5.8.1)
10.5.7.0 USE A1 (10.5.7.1)
10.5.8.0 USE A2 (10.5.8.1)
FIG. 2b
(PRIOR ART)

NODE A ROUTE TABLE
10.5.9.0 USE RTR2(10.5.8.3)
10.5.10.0 USE RTR1(10.5.7.3)

FIG. 5a

NODE A ROUTE TABLE
10.5.7.0 USE A1(10.5.7.1)
10.5.8.0 USE A2(10.5.8.1)
10.5.9.0 USE RTR2(10.5.8.3)
10.5.10.0 USE RTR1(10.5.7.3)

FIG. 5b

NODE A ROUTE TABLE
10.5.9.1 USE RTR1
10.5.7.0 USE A1(10.5.7.1)
10.5.8.0 USE A2(10.5.8.1)
10.5.9.0 USE RTR2(10.5.8.3)
10.5.10.0 USE RTR1(10.5.7.3)

FIG. 5c

NODE A ROUTE TABLE
10.5.9.2 USE RTR1
10.5.9.1 USE RTR1
10.5.7.0 USE A1(10.5.7.1)
10.5.8.0 USE A2(10.5.8.1)
10.5.9.0 USE RTR2(10.5.8.3)
10.5.10.0 USE RTR1(10.5.7.3)

FIG. 5d

NODE A ROUTE TABLE
10.5.10.2 USE RTR2
10.5.7.0 USE A1(10.5.7.1)
10.5.8.0 USE A2(10.5.8.1)
10.5.9.0 USE RTR2(10.5.8.3)
10.5.10.0 USE RTR1(10.5.7.3)

FIG. 5e

MULTIPLE NETWORK CONFIGURATION WITH LOCAL AND REMOTE NETWORK REDUNDANCY BY DUAL MEDIA REDIRECT

CROSS-REFERENCES TO RELATED APPLICATIONS

This application claims the benefit, under 35 U.S.C. §119(e)(1), of U.S. Provisional Application No. 60/057,699, having the same inventor as the present application, filed Aug. 27, 1997, entitled "Multiple Network Configuration With Local And Remote Network Redundancy By Dual Media Redirect," and incorporated herein by this reference.

STATEMENT REGARDING FEDERALLY SPONSORED RESEARCH OR DEVELOPMENT

Not Applicable.

BACKGROUND OF THE INVENTION

The present embodiments relate to digital networks, and are more particularly directed to a multiple network configuration implementing redundancy both within each local network of the configuration as well as between the different remote networks of the configuration, where the redundancy is achieved using a redirect operation across dual media.

Data communication is a critical and everyday part of modern computing, and occurs through the use of various types of networks. Such data communication may be used for various reasons, such as business, science, telecommunications, personal, or entertainment. The span of such data communications may occur in different magnitudes. Particularly, in the network vernacular there has evolved notions of both local area networks (LANs) and wide area networks (WANs). As a generally stated distinction between the definition of a LAN and a WAN, a LAN is for more local communication of data such as within a small location, building, or complex, while a WAN is for communication of data across a greater distance which may be across a nation or even worldwide. Moreover, often a LAN is formed from only one or more locally connected networks, that is, in a manner where a given LAN host station on the network is only capable of communicating to those media which share the same "network" address which corresponds to the host address(es) of the given LAN host station, as is discussed in greater detail below. In contrast, a WAN often includes multiple networks where a given WAN host station may not only communicate to local hosts, but may further communicate via one or more routers with a remote network (and its host stations) where the remote network has a network address different than the network address corresponding to the host address(es) of the given WAN host station. In any event, the existence of networks for purposes of data communication is now very popular, and appears to be a way of life for the foreseeable future.

Various considerations of reliability arise along with the acceptance and proliferation of data communication among networks, one of which is the minimization of down time of a network. In other words, it is known in many types of data communication contexts that it is preferable to reduce or eliminate instances where one or more nodes attached to a network are unable to communicate with one or more of the other nodes also attached to the same network. In this regard, one attempt to minimize downtime of locally connected networks is through the use of so-called redundant solutions. Redundancy typically indicates that some type of resource associated with the network(s) is duplicated, and for reference and possible other purposes a first of these resources may be referred to as a primary resource while the second of these resources is referred to as a secondary resource. In the redundant system, if the primary resource becomes inoperative then the secondary resource is preferably quickly used in place of the primary resource, thereby minimizing or eliminating the chance to perceive the failure of the primary resource. Note that the actual resource or resources which are duplicated in this manner may depend on the particular context and, thus, could include repeating nodes, databases, network media, and still others as will be known by one skilled in the relevant art.

By way of further background, one type of prior art redundancy which has been used in the telecommunications industry has been in the context of an Ethernet LAN, and further involves the implementation of a fairly common network protocol known in the art as IP (internetwork protocol). Often the IP is mentioned as part of TCP/IP or UDP/IP. However, either of those two instances are actually a combination of two standards used in the protocol. For example, with respect to TCP/IP, the first protocol is TCP which is an abbreviation for transport control protocol. The second protocol is the IP introduced above. Although the name TCP/IP combines these two standards, in actuality the standards are implemented in an ordered level manner such that the TCP protocol is closer to the application level and the IP protocol is closer to the physical network connection level. In any event, TCP/IP and UDP/IP are well known and permit packets of information to be sent and received along different types of networks. Returning then to a discussion of the prior art IP approach, which is also detailed in greater fashion later, note that it provides two Ethernet interfaces for each node in the LAN thereby connecting each such node to redundant Ethernet cables. Consequently, assuming no failure of any node in the LAN, then each node may communicate to any other node on the LAN along either (or both) of the two Ethernet cables. However, if a failure occurs along one of the two routes of communication (e.g., a failure in an Ethernet cable), then a node may still communicate to other nodes along the other of the two Ethernet routes of communication. In various contexts such an approach has satisfactorily reduced the amount of network down time and provided valuable reliability to the users of the network.

While the prior art approach of the preceding paragraph provides various benefits, the present embodiments address various of its attributes which in some contexts may provide limitations. As a key example, the above-described approach is constrained to implementation for each single autonomous network, where typically that network is locally formed as a LAN. However, if a first such LAN is connected to one or more remote LANs to form a multiple network WAN, then the prior art approach does not comprehend, for a node in the first LAN, a fault in one of the redundant media in the remote LAN. Further, the prior art approach makes no provision for redundancy along the communication path between the two LANs. Clearly, the use of a WAN which includes multiple networks may be highly desirable or even necessary for various types of communications, with telecommunications as a key example. Thus, an approach which provides redundancy only within each autonomous network LAN may provide unacceptable or at least a severely restrictive limitation in some contexts.

To better understand some of the limitations of the above-described approach to an autonomous network using the IP standard, a brief discussion of IP address formats is now provided. More specifically, under the standards for IP, an IP address for a node on a network is formed by combining four integers typically represented in the following fashion:

Q.R.S.T

Ultimately at the machine level, each of the integers are represented in eight bit binary fashion and thus, provide four "bytes" which are also sometimes referred to as "octets." Thus, the IP address is a total of 32 bits (i.e., four bytes * 8 bits per byte). As binary values, therefore, the values of Q through T are each between 0 and 255. Thus, in decimal form, the same address may be represented as follows, with numeric ranges substituted for the above:

0–255.0–255.0–255.0–255

Still further principles also apply to these addresses, such as the use of "class" identifiers for class A through class E networks based on the different permitted values of the various bytes of the address. For purposes of this document, a detailed explanation of such additional principles is not presented but instead deference is given to one skilled in the art.

In order to ensure an understanding of the above convention, the limitations of the prior art, and the inventive embodiments described later, note that all IP addresses are divisible into two portions, those being a host (or sometimes called a "node") address and a network address. The host address is some number of the least significant bits ("LSBs") of the address (i.e., those to the right of the value), while the network address is then the remaining most significant bits ("MSBs") of the address. For purposes of this document, therefore, and as is conventional in the art, when the term "network" is used it is intended to be defined as the combination of the medium and those network hosts that are connected to that medium and share this same network address. Thus, in the prior art approach described earlier, when it is stated that it is limited to a network, that indicates that only the hosts using that same network address benefit from that approach. Thus, to the extent a first such network is connected to a second network such as through routers or the like, the prior art approach does not permit the first network to perform its redundancy capability with respect to the second network. Lastly, and as also known in the art, note that the actual division of the total 32 bit IP address between a network address and a host address will vary based on certain implementation factors, such as the type of class of the network as well as the use of subnetting. These factors combine to form a so-called network mask which is a 32 bit value used in a logical operation on a bit-by-bit basis with an IP address for a given system-L As a result of this logical operation, the mask blocks or "masks" one portion of the IP address and thereby permits the other portion of the IP address to bypass the mask. These two portions are therefore separated in the manner introduced above, that is, in a group of the MSBs and a group of the LSBs of the IP address. The resulting MSBs form the network address, and the resulting LSBs form the host address.

Given the preceding explanation, note now that the limitation of the above-described approach to a single network provides a quantitative restriction on the number of nodes in the network (e.g., LAN) which may implement the approach. Particularly, assume for a given network that it is defined such that the three most significant bytes of each address form the network address and, thus, the least most significant byte remains to form host addresses for that network. As a result of the one byte of information available to distinguish among host addresses, there are at most 256 distinct values which may be represented. With only this restriction, only up to 256 node addresses may implement the prior art approach for such a network. Additionally, as detailed later, for each group of bits forming a host address, the values of all binary zeros and all binary ones are reserved and not available for use as a node address. Thus, in the present example there are actually only 254 node addresses available. Given this scenario, the above-described prior art redundancy approach is limited to 254 node addresses.

Note that the prior art constraint of a single network solution is not necessarily overcome simply by reducing the number of desired nodes to less than 254 (or less than whatever the number of host addresses are available given the breakdown of the IP address into a network address and a group of host addresses). In other words, there may be additional reasons to support multiple networks (e.g., in a WAN) rather than a single network and, again, the above-described prior art approach will not provide sufficient redundancy to multiple networks. For example, geographical considerations may require a WAN which is implemented by more than one network. As another example, given the introduction to IP concepts provided above, note further that messages submitted along a single network are received by all other nodes on the same network (although there may not be a response by one or many of those nodes). Consequently, if one of the nodes transmits some type of erroneous message or otherwise incurs a problem which is manifested on the network, then the operation of that one node may interfere with the operation of each of the remaining nodes which, by definition, are required to monitor that same network. Thus, a multiple network implementation may be desirable in order to permit numerous networks to interact with one another while avoiding this potential interference problem.

Given the above, the present inventor has appreciated the preceding limitations and provides below a multiple network configuration which implements redundancy between nodes both within each individual network of the configuration as well as between nodes on different networks within the configuration.

BRIEF SUMMARY OF THE INVENTION

In one embodiment there is included a communications configuration comprising a first network medium having a first IP address and a second network having a second IP address. The configuration further includes a first host station with a first interface connected to communicate with the first network medium using the first IP address and a second interface connected to communicate with the second network medium using the second IP address. The configuration further includes a third network medium having a third IP address and a fourth network having a fourth IP address. Still further, the configuration includes a first router station coupled between the first network medium and the third network medium and a second router station coupled between the second network medium and the fourth network medium. Lastly, the configuration includes a second host station. The second host station includes a first interface connected to communicate with the third network medium using the third IP address and a second interface connected to communicate with the fourth network medium using the fourth IP address. The memory of the second host station is programmed to perform various steps. A first step detects a communications failure along a first communication path including the first interface of the first host station, the first network medium, the first router station, the third network medium, and the first interface of the second host station. A second step, responsive to the detected failure, redirects communications addressed to pass from the first host station to the second host station to pass along a second communication path from the second host station to the first host station such that redirected communications are not attempted by the second host station to the first host station along the first communication path.

BRIEF DESCRIPTION OF THE SEVERAL VIEWS OF THE DRAWING

FIG. 1a illustrates a prior art local area network ("LAN") with dual networks connected to provide redundant communications on one of the networks in response to a detected failure in the other of the networks;

FIG. 1b illustrates the LAN of FIG. 1a with a failure occurring along one of the dual networks;

FIG. 2a illustrates the route table of node A of FIG. 1a after the network routes have been established;

FIG. 2b illustrates the route table of node A of FIG. 1b after the network routes and a host route have been established, where the host route has been established in response to the failure condition shown in FIG. 1b;

FIG. 4 illustrates a flow chart of the preliminary steps of the re-routed process performed by nodes A through D of the LANs of the WAN in FIG. 3a;

FIG. 5a illustrates the route table of node A of FIG. 3a after the router information protocol information has been established;

FIG. 5b illustrates the route table of node A of FIG. 3a after the router information protocol information and the local network routes have been established;

FIG. 5c illustrates the route table of node A of FIG. 3b after the router information protocol information and the local network routes have been established, and also once one remote host route has been established in response to the failure shown in FIG. 3b;

FIG. 5d illustrates the route table of node A of FIG. 3b after the router information protocol information and the local network routes have been established, and also once two remote host routes have been established in response to the failure shown in FIG. 3b;

FIG. 5e illustrates the route table of node A of FIG. 3c after the router information protocol information and the local network routes have been established, and also once one remote host route has been established in response to the failure shown in FIG. 3c;

DETAILED DESCRIPTION OF THE INVENTION

Figure 3A:
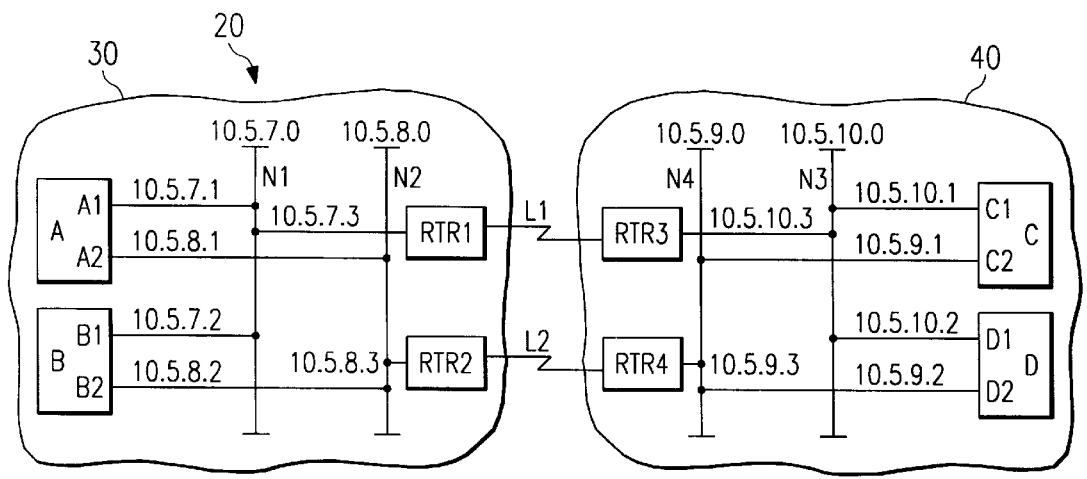
FIG. 3a illustrates a wide area network ("WAN") which connects two remotely located LANs, where dual networks are connected within each LAN to provide redundant communications on one of the networks in response to a detected failure in the other of the networks, and further where dual communication paths are connected between one LAN and the other to provide redundant communications from any node in one LAN to any node in the other LAN and in response to a detected failure either between the LANs or within the configuration of one of the LANs.

Before proceeding with a detailed discussion of the preferred inventive embodiment and by way of presenting a more extensive introduction, FIG. 1a and the following discussion presents an explanation of a prior art LAN 10 and its redundant system introduced earlier. LAN 10 includes dual networks shown generally at N1 and N2. As demonstrated later, these dual networks provide a redundancy feature whereby if one of the networks is detected as inoperable (i.e., not communicating for whatever reason) then the other of the dual networks is used for future communications until the operational error is corrected. In the prior art commercial embodiment, these networks communicated via Ethernet media. For purposes of providing an example below, networks N1 and N2 are arbitrarily assigned network addresses of 10.5.7.0 and 10.5.8.0, respectively. Additionally, for this example as well as the additional network examples in the remainder of this document, note that it is assumed for each network illustrated in the Figures that the three most significant bytes of the IP address define the network address, while therefore the remaining least significant byte of the IP address defines the host address. This assumption is merely by way of example and to simplify the illustrations herein, while one skilled in the art will appreciate that the inventive principles described later may apply to any IP addressed configuration where the IP address is divisible to include a network portion and a host portion. Lastly, note that, as known in the IP art, the "0" as the last byte of each of the above example addresses by definition indicates a network address. In other words, an IP address having a binary "0" in each of the address bits which form the host portion of the IP address indicates that the address is a network address.

LAN 10 further includes two nodes, illustrated as node A and node B. Nodes A and B represent computer stations connected to communicate within LAN 10 and, thus, by way of the Ethernet networks. These computer stations are sometimes referred to as hosts or host stations. The computer stations may be of various types. For example, in the prior art commercial embodiment each of the nodes were Sun SPARC computer stations. Each of nodes A and B may operate according to various different types of operating systems; in the prior art commercial embodiment each of the nodes were implementing a Sun Solaris UNIX operating system. Lastly, each of nodes A and B are considered "multitasking" machines and, thus, are configured to execute more than one application program and also may execute one or more background processes. With respect to the latter, these typically are transparent to the execution of the application program(s). In any event, for purposes of the present discussion, only two background processes are detailed where those processes are directed to a functionality of routing information along LAN 10 as more apparent from the remaining discussion. For reasons more apparent below, these processes are named "routed" and "rerouted", where the former is directed to routing packets across LAN 10 during normal operations and where the latter further assists directing packets across LAN 10 when a failure has been detected in LAN 10. To appreciate the context of routing, note further that each of nodes A and B has dual interfaces, and each interface is connected to a corresponding one of the dual networks N1 and N2. Specifically, node A has one interface A1 connected to network N1 and another interface A2 connected to network N2. Likewise, node B has one interface B1 connected to network N1 and another interface B2 connected to network N2. Additionally, under IP each interface is assigned its own IP address. By way of example, and as shown in FIG. 1a, interfaces A1 and A2 are assigned IP addresses 10.5.7.1 and 10.5.8.1, respectively, while interfaces B1 and B2 are assigned IP addresses 10.5.7.2 and 10.5.8.2, respectively.

The operation of nodes A and B in the context of routing on LAN 10 is as follows. At start-up (e.g., boot-up or reset), each node executes the "routed" and "rerouted" processes, where both of these processes are sometimes referred to as daemons; indeed, the "d" at the end of each of these names is an abbreviation of the use of the daemon term. For the remainder of this document, these processes will be referred to as routed and re-routed. As to the latter, note that the preliminary description of it applies to how it existed and operated in the prior art. As detailed later, however, the inventive embodiments described herein further modify the re-routed process to provide significant improvements over the prior art. Thus, the use of the re-routed identifier is only for sake of facilitating an understanding to one skilled in the art, but is not in any manner used as a limitation to the inventive scope. Returning to the prior art, note that the routed and re-routed processes, as well as any other background process, may be instigated in response to UNIX looking to a particular directory during start-up and executing any program scripts stored in that directory. These program scripts are responsible for launching the routed process and re-routed process. Additionally, and as used later in conjunction with the re-routed process, note that during start up the routed process establishes a route table for the corresponding node. To further demonstrate this point, FIG. 2a illustrates part of the prior art route table for node A after start-up as discussed below, but at this point a few other observations may be helpful. First, one skilled in the art will appreciate that a comparable table is formed for node B as well. Second, since both the routed and re-routed processes exist and are running on each node, one skilled in the art should appreciate that while many of the operations below are described in the context of node A by way of example, a comparable version of the operations are also occuring in node B and could likewise occur in any other nodes if connected to LAN 10. Third, before turning to the information shown in FIG. 2a, note that it is not necessarily exhaustive and, thus, additional information such as certain flags, reference and usage counters, and name aliases also may be included in such a table. This additional information is not detailed here so as to simplify the present discussion. Lastly, note that additional entries beyond that of FIG. 2a are later added to the route table, such as is shown and described later in connection with FIG. 2b.

To appreciate the information shown in FIG. 2a, note first that the routed process identifies to the node the IP address for each interface available to that node. Thus, for node A, the routed process determines that it has access to communicate along interface A1 and interface A2. Note that the indicators "A1" and "A2" may be thought of as alias names for the respective interfaces which are cross-referenced, also by some type of table accessible by node A, to correspond to the IP addresses assigned to these interfaces. In other words, by identifying interfaces A1 and A2, the routed process necessarily is informed that these interfaces also correspond to IP addresses 10.5.7.1 and 10.5.8.1, respectively. From this information, and recalling that the first three of four bytes in the IP address identify a network, then the routed process also is aware that node A may communicate with either network 10.5.7.0 which corresponds to interface to 10.5.7.1 and may communicate with network 10.5.8.0 which corresponds to interface 10.5.8.1. Given this information, note that after start-up the routed process provides an entry (i.e., a row) into the FIG. 2a route table for each of the available interfaces, where the entry identifies both the network address and the node interface through which communication may be had to that network. For purposes of this document, such an entry is hereafter referred to as a network route. For example, looking to the top row in FIG. 2a, a network route is shown which indicates that to accomplish communication via network 10.5.7.0, interface A1 (which has an IP address of 10.5.7.1) is to be used. Similarly, looking to the bottom row in FIG. 2a, a network route is shown which indicates that to accomplish communication via network 10.5.8.0, interface A2 (which has an IP address of 10.5.8.1) is to be used. Certain subsequent uses of these network routes are discussed below. At this point, note that unless and until additional information is added to the route table, then these network routes provide instruction on which interface to use for a communication to any node or nodes on a given network. For example, if node A has some type of information packet it wishes to communicate to any node or nodes on network 10.5.7.0, node A consults its route table and, in response to the top network route, is instructed to route this information packet along interface A1 (i.e., 10.5.7.1). Similarly, if node A has an information packet it wishes to communicate to any node or nodes on network 10.5.8.0, node A consults its route table and, in response to the bottom network route, is instructed to route this information packet along interface A2 (i.e., 10.5.8.1).

Looking now to the re-routed process as opposed to the routed process described above, after the routed process establishes the above-described network routes in the route table for a node, the re-routed process begins a methodology to monitor the continuing availability of a communication path along each network connected to each of the node's interfaces. This re-routed process repeats continuously for all time that the node on which it is running is operational. Moreover, if the node becomes inoperable but is thereafter re-started, then the routed process described above once again commences, and thereafter also is followed by the additional re-routed process steps now described. Once the route table is created in a given instance, the re-routed process forms information messages termed heartbeat packets and transmits those from the node along each of its available interfaces (i.e., that is, those interfaces which the re-routed process perceives as in service for purposes of monitoring for, and responding to, network failures as described below). Before proceeding, note that the term "heartbeat" is included because, as appreciated below, this information provides a repeated periodic indication that a path of communication is still operable (i.e., the existing heartbeat indicates that the communication is still "alive" so to speak). The heartbeat packet includes some type of indication which is perceivable by any node receiving the packet to identify it as a heartbeat packet. In addition, the heartbeat packet also includes an identifier of the node which transmitted the packet, and also the IP address of each of its available interfaces. For example, when node A issues a heartbeat packet, it includes an identifier that node A was the transmitting node, and also includes IP addresses 10.5.7.1 and 10.5.8.1.

Before proceeding with the functionality of the heartbeat packet, note three additional aspects directed to its transmission and receipt. First, with respect to transmitting a heartbeat packet, note in the prior art that such a transmission by the re-routed process is by way of a broadcast, and the broadcast is to the network connected to an interface of the transmitting node. As known in the IP art, a broadcast message is one directed to all nodes which are connected to the network to which the message is sent Also as known in the IP art, to implement the broadcast technique then a binary "1" is placed in each of the address bits which form the host portion of the IP address. Thus, in the present examples where the fourth byte of the IP address forms the host portion of the address, then the fourth byte of the IP address is set to 255. In the example of node A, therefore, its re-routed process broadcasts a message to the network attached to its interface A1, namely, network N1 (i.e., which has an IP address of 10.5.7.0). In this regard, node A includes in its broadcast message a destination IP address of 10.5.7.255, where the last byte therefore defines that the message is a broadcast message. In response and by definition of a broadcast, all receiving nodes on network N1 are directed to examine the message (including the node which sent the message). Second, with respect to receiving a heartbeat packet, and having appreciated now that all nodes on the network examine it, note further that the re-routed process of each receiving node, other than the one which transmitted it, stores a history of the receipt of the heartbeat packet in an internal timing table, where this history includes the IP address from where the heartbeat packet was received as well as the time (measured in seconds) that it was received. The purpose of this internal timing table is detailed later. Third, with respect to both heartbeat packet transmission and receipt, note as an additional part of its initial operation that the re-routed process establishes a timer which it uses to establish both a supply interval which relates to the transmission of heartbeat packets and a timeout interval which relates to the receipt of heartbeat packets. Each of these timing functions is discussed immediately below.

The supply interval as it relates to the re-routed process timer defines the frequency at which each heartbeat packet is transmitted by the corresponding node. For example, assume that the supply interval, which is the same for all nodes implementing the re-routed process, and which therefore include node A, is 25 seconds. Thus, every 25 seconds and under the operation of the re-routed process, node A transmits a heartbeat packet to network N1 via its A1 interface, and also every 25 seconds node A transmits a heartbeat packet to network N2 via its A2 interface. Recall that each receiving node records a history of receiving each heartbeat packet in an internal timing table. Thus, assuming proper operation, each time node A transmits a heartbeat packet in the manner just described, then node B should correspondingly record information relating to receipt of the packet in its internal timing table. Note also that for each transmitting IP address, and for reasons more clear below, only information reflecting its most recently received heartbeat packet is maintained in the internal timing table of the receiving node. Thus, after a first heartbeat packet transmission by node A, then node B records information relating to that first receipt and thereafter expects to receive additional heartbeat packets from that same node A interface and along network N1 for every supply interval; moreover, as each of these expected heartbeat packet arrives at node B, node B updates that information in its internal timing table which relates to the immediately preceding heartbeat packet received from the same interface of node A and along network N1. This is also true of course with respect to the separately sent heartbeat packets from node A to node B along network N2 Given this process, note then that node B must receive a heartbeat packet from node A along each network which is common between the nodes and which is being monitored by the re-routed process.

The timeout interval as it relates to the rerouted process timer defines the deadline by which a node expects to receive a heartbeat packet from a node interface in relation to the last time that same node interface received a heartbeat packet from the same sending IP address. To appreciate this aspect, recall that in addition to node A, any other node in LAN 10 (which consists only of node B in the present example) is likewise executing a re-routed process to perform comparable operations. Thus, during the same period that A is forming its heartbeat packet and transmitting it through its interfaces, node B is doing the same. Consequently, assuming proper operation, at a timeout interval larger than the supply interval, each node should be able to consult its internal timing table and identify receipt of a heartbeat packet from each of the transmitting nodes along each of the corresponding networks. For example, at the expiration of its timeout interval, node A will examine whether by that time it has received a heartbeat packet from node B along all of the networks across which node B has indicated that it may communicate. In other words, recall that node B's heartbeat packet indicates, by including its interfaces of 10.5.7.2 and 10.5.8.2, that it may transmit via networks 10.5.7.0 and 10.5.8.0. Moreover, assume now that the timeout interval, which is greater than the supply interval, equals 30 seconds. Thus, at the expiration of node A's 30 second timeout interval, it examines its internal timing table to determine whether, within the past 30 seconds, it has received a heartbeat packet from node B along network 10.5.7.0 and a heartbeat packet from node B along network 10.5.8.0. The results of this determination, therefore, indicate full proper operation if such receipts occurred within the timeout interval; in contrast, some type of communication failure is presumed if such receipts have not occurred within the timeout interval. The actions following each of these alternatives are discussed below.

If, after the above-discussed timeout evaluations, the internal timing table of a node indicates that all heartbeat packet receipts occurred before the timeout expiration, then the route table for that node (e.g., FIG. 2a) is not modified further. Thus, the network routes already established in the route table serve as the governing indicators for any additional network transmissions by the node unless and until the route table is later modified. Assuming no such modification or at least before such a modification occurs, then as discussed earlier any future transmission of a packet by node A is directed to one of its two interfaces according to the two network routes in its route table. Again, by way of example, recall this means that if node A wishes to communicate to interface B1 of node B (i.e., 10.5.7.2), then this is a transmission to occur over network 10.5.7.0 and, by the guidance of node A's route table, it is communicated from node A over its interface A1 (i.e., 10.5.7.1). Similarly, if node A wishes to communicate to interface B2 of node B (i.e., 10.5.8.2), then this is a transmission to occur over network 10.5.8.0 and, by the guidance of node A's route table, it is communicated from node A over its interface A2 (i.e., 10.5.8.1).

If, after the above-discussed timeout evaluations, the internal timing table of a node indicates that an expected heartbeat packet receipt has not occurred within the timeout interval, then the re-routed process modifies the route table for that node (e.g., FIG. 2a) to redirect future transmissions to avoid this detected failure. For example, FIG. 1b repeats the identical illustration of LAN 10, but adds to it the assumption that a failure has occurred on network N1 as is shown by way of an "X" designated at F1. Such a failure could occur in various ways, such as if a physical break were to occur in the Ethernet medium. Prior to that failure, node A receives successive heartbeat packets from node B along network N1 and, in response to each packet, node A updates its internal timing table accordingly. However, when the failure occurs, then after the next timeout period node A discovers that it has not received a heartbeat packet from node B along network N1 in the last timeout period (e.g., 30 seconds). Thus, node A in this instance has detected a failure along network N1 and responds as provided below.

When a failure to receive a successive heartbeat packet is detected such as provided by way of example above, the re-routed process for the node detecting the failure modifies the node's route table provided an alternative working route is still available. In the present example directed to node A, it has detected such a failure, and FIG. 2b illustrates the resulting modification to its route table. Again, note that all nodes which are running the re-routed process and connected to the same network as is node A will also detect the failure, but again node A is discussed here by way of example. Specifically, note that FIG. 2b includes from its bottom toward its top the same two network routes from FIG. 2a. In addition, however, node A's route table has now been modified to include at its top entry what is referred to as a host route. The host route is so named because it is a routing direction which pertains to a single host (i.e., to a single node interface) rather than to an entire network as is a network route. Looking particularly to the newly entered host route, note that FIG. 2b includes the following host route entry:

10.5.7.2 use A2(10.5.8.1)

With reference to this host route entry, note that the left portion of the entry identifies the IP address of the transmitting host interface which failed to send a heartbeat packet within the timeout interval. In the present example, this IP address is 10.5.7.2 which corresponds to interface B1 of node B. In addition and as appreciated below, the host route entry also specifies the alternate node A interface which is still connected to an operable communications path to node B and, thus which, should thereafter (until a correction is detected as detailed later) be used by node A for communication to the failed destination IP address (which is identified in the left portion of the host route). More specifically, the alternate node A interface specified as the right portion in the host route is the node A interface which is connected to the network which has maintained connectivity to node B.

Having introduced the host route entry in FIG. 2b, consider now in more detail its effect again by using an example. First, recall that a route table in general is consulted by a node when it transmits packets within LAN 10. Thus, when node A is preparing to send a packet after the above-detected failure, it consults the route table of FIG. 2b. Now, assume by way of example that node A is preparing to send a packet to a destination IP address of 10.5.7.2. If it were not for the host route of FIG. 2b, then by consulting its route table (i.e., that shown in FIG. 2a) node A would determine that the destination address corresponds to network 10.5.7.0 and, thus, due to the top entry (i.e., the network route) of the route table in FIG. 2a node A would then transmit the packet out of its interface A1. However, interface A1 communicates with network N1 which has since been found to be inoperable and, therefore, attempting to communicate in that manner would be undesirable. The added effect of the host route of the route table of FIG. 2b, however, avoids this undesirable result. Specifically, when node A consults the modified route table of FIG. 2b, it ascertains that the destination IP address is specified in a host route of the route table. Note that the guidance provided by a host route supersedes the guidance of a network route. Therefore, while for the present example the destination IP address of 10.5.7.2 corresponds to the network route for network 10.5.7.0, it also corresponds to the host route shown in FIG. 2b. Because the host route is given higher priority than the network route, then node A is instructed to use interface A2 when transmitting to the destination IP address of 10.5.7.2 rather than using interface A1 as would be the case if the network route from the route table were used. In other words, at this point the information packet is redirected around the faulty medium and instead to the redundant medium. Lastly, given the guidance of the host route, note with respect to FIG. 1b the effect of the transmission. Specifically, when the packet at issue is sent from node A to the destination IP address of 10.5.7.2 via interface A2, then the packet is sent to node B along network N2 rather than N1; this packet therefore reaches the node which includes the proper destination IP address, namely, it reaches node B along a network which is still detected as operable. In other words, the failed network (i.e., network N1) is avoided and the alternate (i.e., redundant) network N2 in the dual set of networks provides a viable communications path.

As a final aspect of the prior art re-routed process, note that the supply interval and timeout interval processes described above continue even after a defect is detected. At some point, assuming the defect is cured, then the re-establishment of the failed communication path is detected. Thus, in the context of the preceding example, eventually network N1 is repaired and node A will receive a heartbeat packet from node B along N1 within the timeout interval. When this occurs, the re-routed process once again modifies node A's route table by removing the host entry which was directed to redirecting transmissions around the failure. In the present example, therefore, the top entry of FIG. 2b would be removed from node A's route table, thereby restoring the table to the form shown in FIG. 2a. Thereafter, communications may occur between node A and node B along either network N1 or network N2, and the above processes may continue monitoring to detect the next failure if one should occur.

Given the detailed presentation above of the prior art, recall that the Background Of The Invention section of this document sets forth various disadvantages of the prior art based on its limitation to networks directly connected to node implementing the prior art system. While the reader is invited to now review those disadvantages, the preceding details as well as an illustration of a multiple network system using routers (e.g., WAN) further permits an examination of the intricacies of how the prior art system does not apply to such a system. In this regard, the following discussion pertains to the present inventive embodiments, and also should further demonstrate the limitations of the prior art as constrained in the manner set forth above.

FIG. 3a illustrates a network configuration illustrated by way of example as a WAN designated generally at 20 in accordance with the present inventive embodiments. WAN 20 includes a first LAN 30 and a second LAN 40. As appreciated from the remaining discussion, an important distinction between the configuration of FIG. 3a and that in FIG. 1a is the existence of networks which are not directly connected to the same nodes. In other words, in LAN 10 of FIG. 1a, for each network shown, each node has an interface which is directly connected to such network, that is, in IP terms the interface address has the same network address portion as the network address. For example, in node A in FIG. 1a, it has interface addresses 10.5.7.1 which includes the same network address portion as the network 10.5.7.0 to which it is directly connected, and it has another interface 10.5.8.1 which includes the same network address portion as the network 10.5.8.0 to which it is directly connected. In contrast and as better appreciated below, the overall configuration of WAN 20 include nodes which have interfaces which, through the use of a router, may communicate with one or more networks having a different network address than one which corresponds to the node. In any event, given this distinction, the components connecting directly to a given network (i.e., having IP addresses corresponding to that network) are described as local with respect to one another, while each of the components having IP addresses having network portions which are different than that of other networks are described as "remote" with respect to those other networks (and the components which are directly connected to such other networks). These distinctions are further understood after the following introduction to the various items illustrated in WAN 20.

Looking to LANs 30 and 40, note that each by itself includes a hardware configuration in the same manner as LAN 10 of FIG. 1a–b. Indeed, with respect to LAN 30, the same node conventions and network addresses are used to indicate that by itself it may operate in the fashion described earlier. However, in accordance with the present invention, additional aspects are provided to allow further redundancy in the context of WAN 20. Looking to each LAN of WAN 20, and again to simplify the present illustration, each of LAN 30 and LAN 40 includes only two local nodes, while in actual implementation it is possible and indeed likely that many more than two nodes are implemented per LAN. Since LAN 30 in the local sense includes the same items as LAN 10, then these nodes are nodes A and B. In similar fashion, LAN 40 includes nodes C and D. In the preferred embodiment, each of nodes A through D are Sun SPARC computer stations implementing the Solaris UNIX operating system. Within each LAN, each of its nodes also has interfaces to dual redundant local Ethernet networks. For example in LAN 30, node A has interfaces A1 to network N1 and A2 to network N2 and node B has interfaces B1 to network N1 and B2 to network N2. Also, in LAN 40 node C has interfaces C1 to network N3 and C2 to network N4 and node D has interfaces D1 to network N3 and D2 to network N4.

WAN 20 further includes additional nodes and conductors to provide dual communication between LANs 30 and 40, that is, on an inter-LAN or WAN basis. More particularly, each LAN has one router node for each of its dual networks. Thus, LAN 30 has a router RTR1 connected to network N1 and a router RTR2 connected to network N2, while LAN 40 has a router RTR3 connected to network N3 and a router RTR4 connected to network N4. Moreover, these routers are paired with one another to provide two communication paths between LANs 30 and 40. Specifically, router RTR1 is connected via a line (e.g., a telephone line) L1 to communicate with router RTR3 and, therefore, to permit communication between network N1 of LAN 30 and network N3 of LAN 40. Also, router RTR2 is connected via a line L2 to communicate with router RTR4 and, therefore, to permit communication between network N2 of LAN 30 and network N4 of LAN 40. The manner in which this communication occurs is described later in connection with various routing tables. By way of introduction, however, note that in the present inventive embodiments that such communication permits redundant communication paths between LANs 30 and 40 that despite a communications failure of one path between the LANs there is still a second redundant path over which communications may occur. Indeed, note that such a failure of a communications path may occur anywhere along a communication path available to a node in a LAN and still be overcome by the inventive embodiment. In other words, the present following inventive approach permits ongoing communication despite a failure along line L1, line L2, or along one of the networks of either of LAN 30 or LAN 40 (including a failure of one of the nodes or one of the node interfaces).

To facilitate a discussion of examples below and to illustrate the use of the terms "local" and "remote" as introduced above, each of the networks and node interfaces in FIG. 3a are assigned arbitrary IP addresses as shown in the Figure. For example, network N1 of LAN 30 has address 10.5.7.0, and thus nodes A and B are local with respect to that network (and to one another) because each has an interface connected directly to that network, that is, having an IP address which has the same corresponding IP address network portion (i.e., 10.5.7). However, note further that node A (and node B) may further communicate as shown later, through routers RTR1 and RTR2, to networks N3 and N4. These latter networks have IP addresses 10.5.10.0 and 10.5.9.0 which, therefore, include IP address network portions (i.e., 10.5.10 and 10.5.9, respectively) which differ from the network portions of the IP addresses of the interfaces of node A (i.e., 105.7 and 10.5.8). Therefore, networks N3 and N4 are remote with respect to node A. One skilled in the art will further appreciate under this convention that networks N3 and N4 are remote with respect to node B as well (and, conversely, networks N1 and N2 are remote with respect to nodes C and D).

Figure 4:
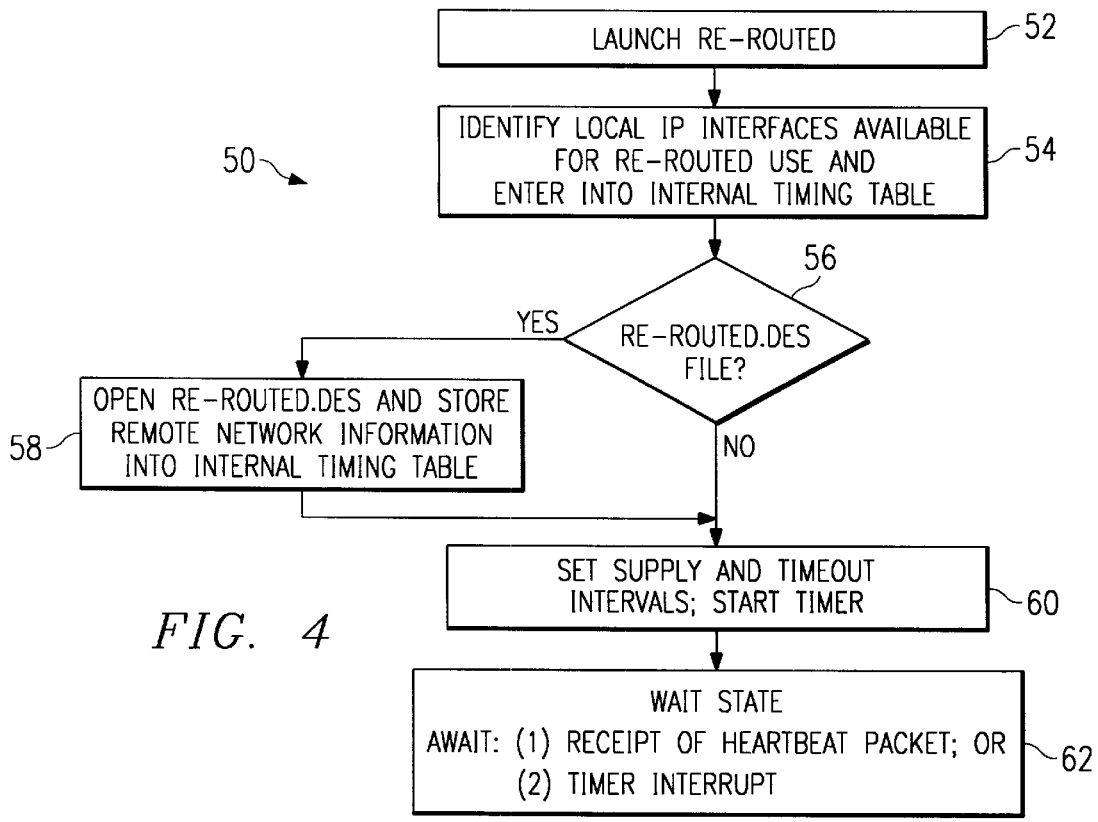

FIG. 4 illustrates a flowchart of a method 50 including a set of operational steps performed by the re-routed process in each of the nodes in WAN 20 in accordance with the present inventive embodiment Once more, recall from earlier that the term re-routed process is not intended as any limitation on the inventive scope, but is used instead to reflect how the preferred embodiment is related to the prior art re-routed process and to facilitate an understanding of the methodology given what has been presented above. Turning to method 50, note at the outset that some of its steps and attributes are comparable to operations performed in connection with the previously described prior art; thus to simplify the discussion below certain details are not re-stated with it instead assumed that the reader is familiar with the principles described above. Looking now to step 52, it represents the launching of the inventive re-routed process at those nodes where it is desirable to perform the process. For the present example of WAN 20, assume that each of nodes A, B, C, and D perform this step. Note, however, that some of those nodes, or also other nodes connected within WAN 20, may be set up so that they do not perform the re-routed process. Returning to the nodes which do perform the re-routed process, they launch the process in the same manner described above with respect to processes in general. Thus, the file to accomplish the re-routed process is stored in a particular directory of each node and, by operation of the operating system, the re-routed process is commenced in response to the operating system looking to that directory during start-up and executing the process. Thus, consistent with the earlier distinction regarding processes as opposed to application programs, note that the preferred embodiment operates in a manner independent of and transparent to any application program(s) executing on any node of WAN 20. Such an approach provides numerous advantages as will be ascertainable by one skilled in the art. For example, the steps of method 50 may be achieved without having to modify the existing application program(s) on any node, and therefore those programs may be subsequently changed or supplemented without interfering with the operation of method 50. As another example, because the processes are transparent to the application programs, then the latter should not have to be modified to accommodate the former. After the launch of the re-routed process, method 50 continues to step 54.

Before proceeding with step 54, note in addition to the steps of method 50 that the re-routed process as described below once again updates the route table for the corresponding node performing the re-routed process. Thus, while FIG. 4 concentrates on the steps of the re-routed process, it should be understood that each such node also performs the routed process at start-up and thereby creates a route table in the manner described above with respect to the prior art. Indeed, in this respect, note that the prior art routed process includes an additional set of steps when a network may communicate, as is the case in FIG. 3a, to another network by way of one or more routers. Particularly, these additional steps are directed to a functionality known in the art as a router information protocol ("RIP"). Under this protocol, each node periodically receives (from the other broadcasting router nodes connected to each of its local networks) route information from those nodes. More specifically, the router nodes report a list of each of the remote networks with which the router node may communicate. Again, node A will be discussed by way of example for this as well as subsequent steps, but with it understood that the remaining nodes in WAN 20 perform comparable operations. Thus, under RIP node A receives remote network accessibility information from both router RTR1 and router RTR2. In other words, router RTR1 indicates to node A that router RTR1 may communicate with remote network 10.5.10.0 while router RTR2 indicates to node A that router RTR2 may communicate with remote network 10.5.9.0. In response and also as part of RIP, node A enters this information into its route table, as illustrated in FIG. 5a. Specifically, in FIG. 5a, note that the entry created in response to the RIP information directs that for future communications to network 10.5.9.0, such communications should be by way of router RTR2. Similarly, the router table indicates that for future communications to network 10.5.10.0, such communications should be by way of router RTR1. In addition, note that router names are merely alias names for the respective nodes and these aliases are also cross-referenced, also by some type of table accessible by node A, to correspond to the IP addresses assigned to these nodes. Thus, for purposes of clarity, while these aliases are shown in the route table of FIG. 5a, also shown in parenthesis is the IP addresses assigned to the interfaces of these routers. More specifically, each parenthetical IP address identifies the interface of the router which is accessible to node A by a corresponding network. In addition to RIP, note further that the operation of the routed process on each node also identifies the local network routes for the node and adds them to the node's route table. By way of example, FIG. 5b illustrates node A's route table on the node which includes the remote network routes from FIG. 5a at its bottom, and further adds the local network routes. With respect to the local network routes, note that they are obtained and stored in the same manner described for the prior art operation in connection with FIG. 2a. In other words, a network route is created for each of a node's interfaces. Moreover, because node A in FIG. 3a uses the same conventions as node A in FIGS. 1a–b, then note that the top two entries (i.e., the local network routes) in FIG. 5b are the same as the two entries in FIG. 2a described above.

In step 54, the re-routed process on each node identifies the IP addresses for each of the interfaces on the node which are available for use in redirecting messages and stores them in an internal timing table which is used and managed by the re-routed process for performing the functionality described later. Note in this regard that the list of IP addresses may merely match those node interfaces which are identified by the routed process as described above. Thus, for node A, step 54 may identify the same IP addresses as those shown as the top two entries in FIG. 5b. Alternatively, note further in the preferred embodiment that it is contemplated that a node may have one or more interfaces which, while functional for the node and thereby used for communication, are masked from the redirecting procedure. In this alternative, therefore, note that step 54 does not identify such interfaces and, thus, they are not identified in the node's internal timing table. Despite this alternative, for simplicity sake the remainder of the discussion assumes that all interfaces for each node are identified by the occurrence of step 54 on each such node. For example with respect to node A, the re-routed process when accomplishing step 54 enters both A1 (and its IP address of 10.5.7.1) and A2 (and its IP address of 10.5.8.1) into its internal timing table.

In step 56, the re-routed process determines whether the node on which it is executing has what is referred to here by way of illustration as a "re-routed.des" file. More particularly and as better appreciated by the conclusion of method 50, if the re-routed.des file exists on a node then it describes or identifies remote networks which are to participate in the steps which provide remote failure detection and remote package redirection. This is in contrast to the prior art which achieved only local failure detection and local package redirection. In other words, to the extent there are redundant physical paths between remote networks such as is shown via lines L1 and L2, then step 56 begins the configuration to accomplish redundant communication across those lines. In step 56, the preferred technique for identifying to a node its redundant remote networks is by way of having the re-routed process read the re-routed.des file, which is a separate file which is preferably on hard storage in the node. In the convention of DSC Communications Corporation, such a file is referred to as a descriptor file which includes human readable text, is easily modified with a text editor, and which may characterize various attributes of the node and be read by other node processes as well. Importantly, note that this technique is preferred and advantageous for various reasons. For example, because the descriptor file is human readable, it may be easily confirmed to accurately reflect the remote networks. As another example, as a separate file the remote networks need not be "hard coded" into the source code which forms the re-routed process. As such, this information need not be re-compiled, linked and endure possible other activities with each processing of the source code. Still further, when it is desired to change the indication of the remote networks for a given node, they are easily altered by a text editor rather than having to customize the source code at each node. Given these advantages, the text lines for inclusion in the descriptor file for node A to identify the remote networks with which it may communicate in a redundant fashion are as follows:

| <name> | <network i.d.> | <netmask> | <broadcast addr> | <router> |
|---|---|---|---|---|
| remote | 10.5.9.0 | 255.255.255.0 | 10.5.9.255 | RTR2 |
| remote | 10.5.10.0 | 255.255.255.0 | 10.5.10.255 | RTR1 |

From the above text lines, note that in addition to identifying the remote networks to which redundant communication may be had, the relevant descriptor file lines also indicate the router node through which communication occurs to the corresponding remote network. Thus, for node A to communicate with remote network 10.5.9.0, the communication path is through router RTR2. Similarly, for node A to communicate with remote network 10.5.10.0, the communication path is through router RTR1. These paths are easily confirmed by tracing through the connections shown in FIG. 3a. In any event, having described the re-routed.des file, if one exists for a given node then method 50 continues to step 58, whereas if one does not then the flow continues to step 60.

In step 58 the re-routed process on each node opens the re-routed.des file, and copies the information of its identified remote networks into the internal timing table for the corresponding node. Thus, in the example of node A, step 58 copies the addresses of 10.5.9.0 and 10.5.10.0 into node A's internal timing table, as well as the remaining information shown above. Next, method 50 continues to step 60.

In step 60 the re-routed process on each node establishes the time values for the supply interval and the timeout interval for the node, with it understood that each node will have the same such values. As in the prior art described above, note that these values govern the transmission of heartbeat packets as well as the evaluation of their timely receipt. For subsequent discussion, assume as was the case in the prior art that the supply interval is set to 25 seconds and the timeout interval is set to 30 seconds. After these values are established, step 60 starts a timer for purposes of governing a timed loop as appreciated from additional steps of method 50 described below. Next, method 50 continues to step 62.

Step 62 represents a wait state for each node implementing the re-routed process. Specifically, during step 62, the above-mentioned timer advances, but otherwise the process awaits one of two events, either of which causes method 50 to vector to a different portion of software steps thereby commencing a different sequence of events. Particularly, to advance from step 50, either a heartbeat packet is received by the node or a timer interrupt is received. In the illustration of FIG. 4, receipt of a heartbeat packet causes method 50 to vector to step 64 of FIG. 6, while receipt of a timer interrupt causes method 50 to vector to step 84 of FIG. 7a. Each of these alternative flows is described below. Before proceeding, note again that the steps of method 50 apply to each node which is performing the re-routed process; however, from this point forward it is easier for understanding purposes to discuss the methodology in the context of a single node, because different conditions may cause different flows in the methodology for different nodes. As a result, the remaining discussion focuses on a single node for the sake of simplicity.

Figure 6:
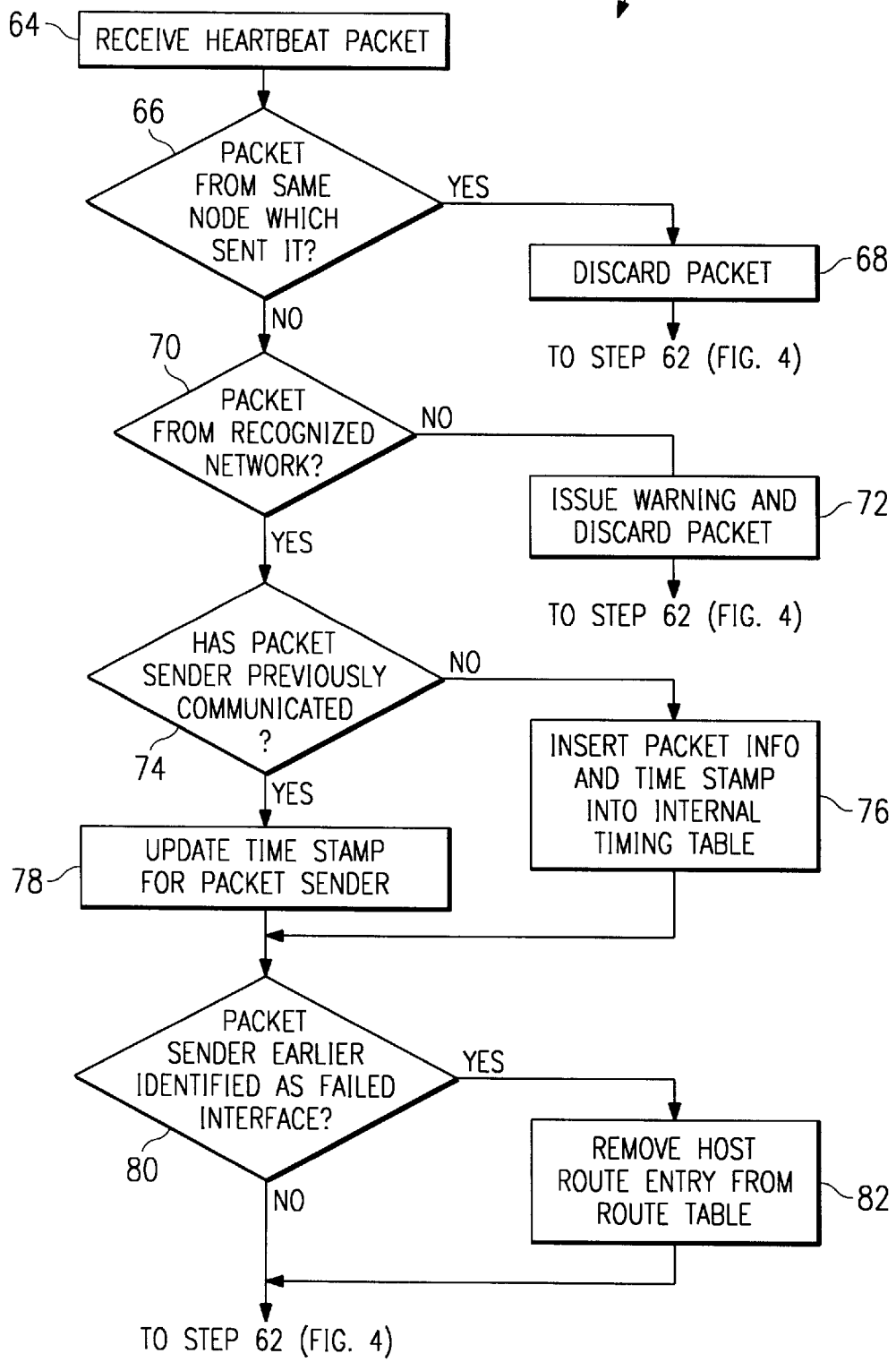
FIG. 6 illustrates additional method steps to follow the wait state of FIG. 4 in the event a heartbeat packet is received.

FIG. 6 illustrates the steps of method 50 which occur in response to the node receiving a heartbeat packet during the wait state shown as step 62 in FIG. 4. Thus, by way of indicating this flow, FIG. 6 commences with a step 64 where it is shown that a heartbeat packet is received by the node running the re-routed process. Next, the flow of FIG. 6 continues to step 66.

In step 66, the re-routed process on the node which received a heartbeat packet determines if the heartbeat packet was transmitted by the same node which is now receiving it. In other words, recall that heartbeat packets are broadcast messages. Thus, each node on the network receives the message, including the same one which sent it. If the heartbeat packet was sent by the same node which received it, then the flow continues to step 68. If the heartbeat packet was not sent by the same node which received it, then the flow continues to step 70.

In step 68, the re-routed process on the node which received a heartbeat packet that was sent by itself merely discards the heartbeat packet. In other words, no additional active step is taken as is the case shown below for heartbeat packets received from other nodes. Instead, once the heartbeat packet is discarded, method 50 returns to the wait state of step 62 of FIG. 4. Thus, one skilled in the art will appreciated that upon returning to the wait state, the re-routed process will once again await either receipt of another heartbeat packet or receipt of a timer interrupt as described later in connection with FIGS. 7a–b.

In step 70, the re-routed process determines whether the heartbeat packet received in step 66 is from a recognized network. In other words, a node configured as described in the present embodiments may properly receive a heartbeat packet from either a local network or one of the remote networks identified in the re-routed.des file discussed in step 58. Thus, step 70 determines whether the received heartbeat packet is from one of these recognized networks. If the heartbeat packet is not received from a recognized network, then method 50 continues to step 72. To the contrary, if the heartbeat packet is received from a network which is recognized by the node, then method 50 continues to step 74.

Step 72, having been reached because the heartbeat packet as received is from a network which is not recognized, generates an error message for purposes such as troubleshooting. Note that this error message is preferably stored in a log file which may thereafter be reviewed, where in the context of Solaris UNIX such a file is known as a "messages" file. Of course, sufficient information is included in the error log so that it is readily understood at a later time to facilitate a review of the possible cause of the erroneous heartbeat packet. Once the error message is stored, method 50 discards the heartbeat packet and returns to the wait state of step 62 shown in FIG. 4.

In step 74, having been reached because the heartbeat packet as received is from a recognized network, the re-routed process determines whether it has previously received a heartbeat packet from the same node which transmitted the current heartbeat packet. Note that this determination is preferably made by consulting the node's internal timing table and evaluating whether it already stores a time stamped entry for a previously received heartbeat packet from the sending node's IP address. If no such entry exists, the flow continues to step 76. On the other hand, if such an entry exists and thereby indicates that the node which sent the heartbeat packet has previously communicated another heartbeat packet to the receiving node from the same IP address, then the flow continues to step 78.

In step 76, the re-routed process on a node which received a heartbeat packet from a node which has not previously communicated a heartbeat packet from the identified IP address inserts the interface data from the heartbeat packet into the node's internal timing table. In addition, this entry is time stamped with a time, measured in seconds, which indicates when the heartbeat packet was received. By way of example, therefore, assume that node A receives a heartbeat packet from interface B1 of node B on August 22 at a time of 10:12:17 (i.e., hours:minutes:seconds). In step 74, therefore, node A stores an entry into its internal timing table indicating the following:

10.5.7.2 last heard from: August 22 10:12:17

Similarly, note that the inventive embodiment further contemplates receipt of heartbeat packets from remote, as opposed to local, node interfaces. Thus, assume instead of the above heartbeat packet from node B that node A received a heartbeat packet from interface C2 of remote node C, and again on August 22 at a time of 10:12:17. In this instance, step 74 would enter into node A's internal timing table the following entry:

10.5.9.1 last heard from: August 22 10:12:17

Next, the method continues to step 80, described after the following discussion of step 78.

In step 78, the re-routed process on a node which received a heartbeat packet from a node which has previously communicated a heartbeat packet from the identified IP address updates the already-existing data in the node's internal timing table. Specifically, the update is to the time stamp of an earlier entry in the internal timing table which corresponds to the same interface which sent the current heartbeat packet. This entry is in the same form as that shown above with respect to step 76 and, thus, includes the IP address of the interface which transmitted the heartbeat packet as well as a time stamp of when that heartbeat packet was last received. To perform the update, therefore, the previous time stamp for the entry is replaced with a new time stamp identifying the time of receipt for the newly-received heartbeat packet. Next, the method continues to step 80.

In step 80, the re-routed process determines whether the transmitting interface identified in the heartbeat packet is one which has earlier been detected by the re-routed process as a failed communication path and consequently for which a redirected route is currently established. Particularly, recall that the inventive re-routed process may detect failures for either local or remote interfaces. Moreover, and as better appreciated below by way of example, once such a detection occurs, the route table for the node is updated with a host entry corresponding to the failed interface IP address, and further specifying an alternate route to communicate with that interface. Thus, step 80 determines whether such an entry has been created in the route table of the node which received the heartbeat packet If such an entry exists, the method continues to step 82. On the other hand, if no such entry exists, then the method returns to the wait state of step 62 in FIG. 4.

Figure 7B:
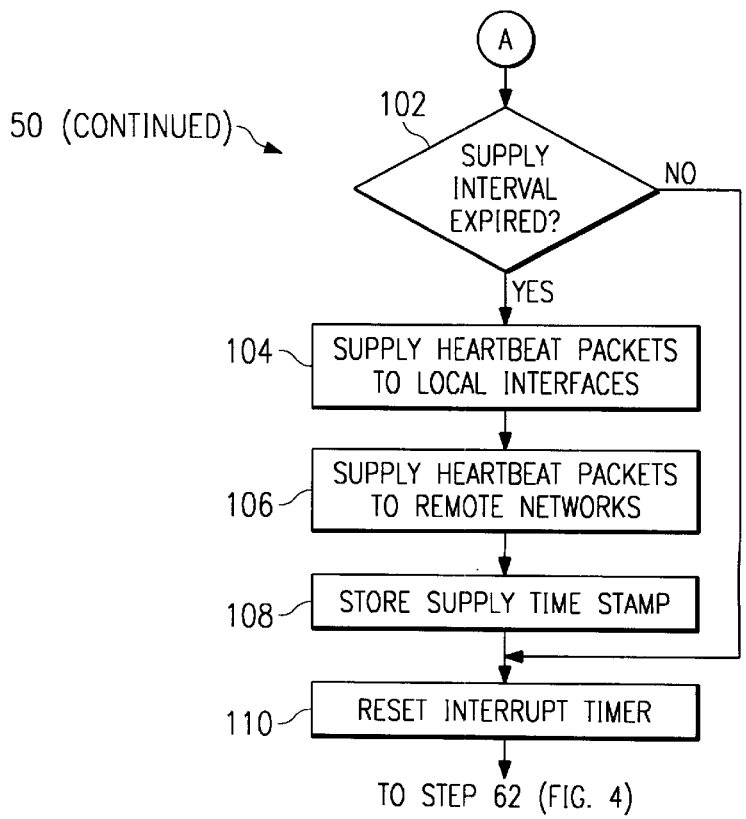
FIGS. 7a–b illustrates additional method steps to follow the wait state of FIG. 4 in the event a timer interrupt is received.
Figure 7A:
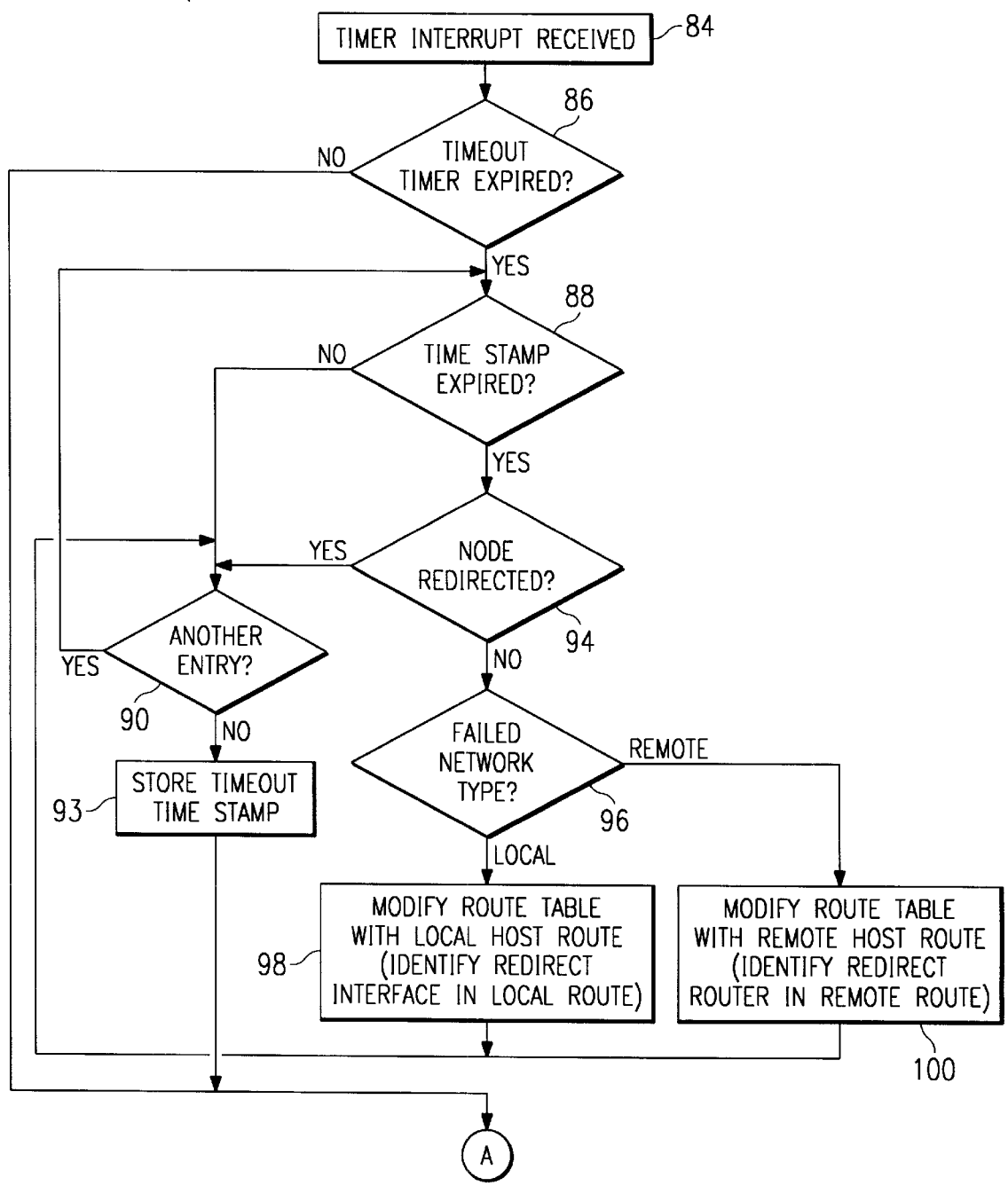

In step 82, the re-routed process removes from the route table of the node the already-existing host route entry which corresponds to the currently received heartbeat packet. To further appreciate the function of this step, note that the already-existing host route entry is used for redirecting messages around what has been determined to be a failed communication path through and including the interface identified in the host route entry. However, if step 82 is reached, then that same interface has now successfully transmitted a heartbeat packet and, thus, it is likely that the failure in ability to communicate with that interface has been resolved. Thus, at least at this point in the flow the host route, which otherwise would direct messages around that interface, may be removed from the route table. As appreciated below, if a subsequent failure is detected with this same interface, then a new host route is formed in the route table. In any event, after step 82, the method continues to the wait state of step 62 shown in FIG. 4, once again therefore to await either receipt of another heartbeat packet or a timer interrupt FIGS. 7a–b illustrate the steps of method 50 which occur in response to the node receiving a timer interrupt during the wait state shown as step 62 in FIG. 4. Thus, by way of indicating his flow, FIG. 7a commences with a step 84 where it is shown that a timer interrupt has been received. Next, the flow of FIG. 7a continues to step 86.

In step 86 the re-routed process determines whether the timeout interval has expired. In the preferred embodiment, this is accomplished by subtracting from the current time the time at which the last timeout interval expired (where that time has been stored as appreciated in step 93 described below), and then evaluating whether the result exceeds the timeout interval. More particularly, note that it is contemplated that timer interrupts will occur far more frequently than the period of the timeout interval. For example, assume the last time a timeout interval occurred was at 12:15:17, and the next timer interrupt is generated at 12:15:25. Consequently, step 86 determines that 8 seconds have elapsed, and this is less than the timeout interval of 30 seconds. In this case, it is not yet time to evaluate a timeout scenario and thus method 50 continues to step 102. On the other hand, if the current time is more than 30 seconds later than when the last timeout interval expired, then method 50 continues to flow to steps 88 through 100. At this point, note generally that steps 88 through 100 pertain to the detection of communication failures and responding to such failures, while steps 102 through 110 pertain to supplying heartbeat packets to local and remote networks. Each of these alternative groups of steps is described below, first beginning with steps 88 through 100 and then following with steps 102 through 110.

Turning now to steps 88 through 100 as they pertain to communication failure detection and response, in step 88, having been reached because the timeout interval has expired, the re-routed process reviews a time-stamped interface entry in the node's internal timing table. At this point and as appreciated from step 90 described below, note that an internal timing table is likely to have numerous interface/time stamp entries, and that various of steps 88 through 100 are repeated for each of those entries. Thus, it is understood that the following discussion is directed to the first of these entries in the internal timing table, while the remaining entries are evaluated in a like manner. Turning to the analysis of step 88, it determines whether the time stamp for the entry has expired by subtracting the time stamp from the current time, and comparing the result to the timeout interval. More specifically, an entry is considered expired if its time stamp indicates that its receipt occurred at a time longer ago than the size of the timeout interval. In this regard, recall that each time an entry is made into the internal timing table in response to a received heartbeat packet, the entry includes the time at which the heartbeat packet was received. If step 88 determines that the time stamp reflects receipt of the heartbeat packet within a period less than the timeout interval, then method 50 continues to step 90. On the other hand, if the heartbeat packet was received at a time outside of the timeout interval (i.e., outside of the last 30 seconds), then the time stamp is considered expired and the method continues to step 94.

In step 90 the re-routed process determines whether the node's internal timing table includes additional heartbeat packet entries/time stamps which have not yet been evaluated. If so, method 50 returns to step 88 to begin review of the next entry. If all entries in the internal timing table have been analyzed, then method 50 continues to step 93. Step 93 records a time stamp of the current time which provides a timeout time stamp as a basis for comparison for the next occurrence of step 86. In other words, this timeout time stamp is then available for the next occurrence of step 86 to determine whether the timeout interval has once again expired once the next timer interrupt is received.

In step 94, having been reached because the internal timing table entry at issue has a time stamp which is expired, the re-routed process determines whether the interface identified in the expired entry is one which has earlier been detected by the re-routed process as a failed communication path and consequently for which a redirected route has been established. As described earlier in connection with step 80, recall that the route table will include a host route corresponding to the interface if such a redirected route has been established. Thus, step 94 determines whether such an entry has been created in the route table. If such a redirecting entry exists, method 50 continues to step 90 to once again repeat the process if another heartbeat packet receipt entry exists in the internal timing table. On the other hand, if no redirecting entry exists in the node's route table, then method 50 continues to step 96.

By reaching step 96, note that the re-routed process has identified an expired time stamp in the node's internal timing table. Consequently, this indicates that the node has detected a communications failure occurring somewhere along the path from the transmitting IP address to the receiving node. Given this finding, in step 96 the re-routed process determines whether the failure to communicate is from a local network or from a remote network. If the detected failure is along a remote network, then method 50 continues to step 100. On the other hand, if the detected failure is along a local network, then method 50 continues to step 98. Each of these alternative resulting steps is discussed below.

In step 98, the node which detected a failure along a local network responds in the same manner as discussed above in the prior art and, thus, the reader is referred to the previous discussion for detail. Briefly summarizing the functionality, the re-routed process modifies the node's route table to include a host route entry. Recall that the top entry in FIG. 2b illustrates an example of such an approach, where node A detected a failure in network N1. In the same manner, therefore, node A of LAN 30 could likewise detect such a failure, and note in the context of the present embodiment that such a failure is one in a local as opposed to remote network. Thus, in this event, the same top entry from FIG. 2b would be added to the top of node A's route table. In other words, a host route entry is made in the route table which in its left portion identifies the IP address of the interface of the transmitting node which failed to timely communicate a heartbeat packet and within its right portion identifies the interface of the receiving node which is connected to the network which is still operational. Note now that this host route entry pertains to a local host (i.e., a local node) and, thus, may be referred to as a local host route entry to contrast it with an entry type described below. In any event, given this functionality, one skilled in the art will appreciate that the preferred embodiment may accommodate local communication failures and redirect messages locally across the second of the dual communication paths. After step 98, method 50 returns to step 90 to repeat the above process if there is another heartbeat packet/time stamp in the internal timing table, or to continue to step 102.

Figure 3B:
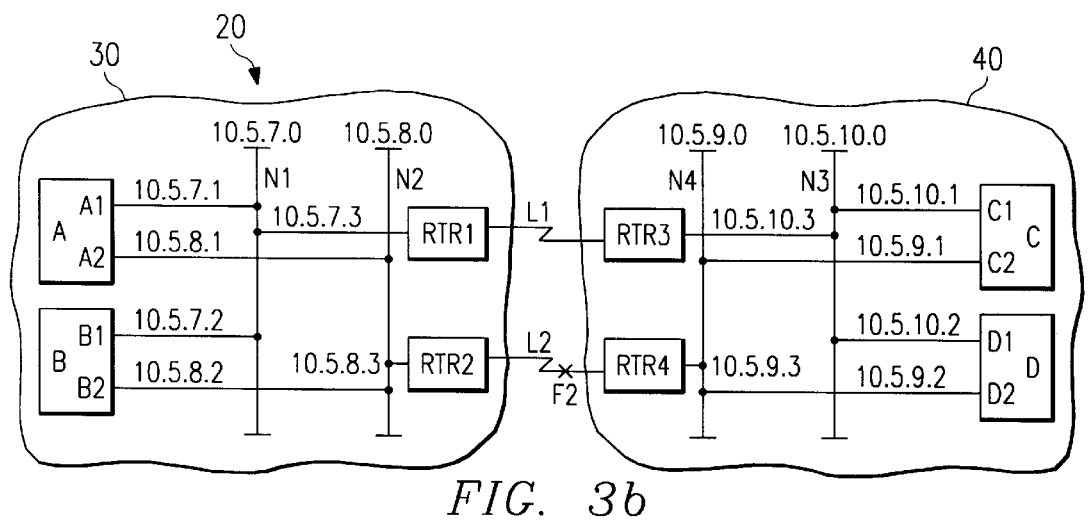
FIG. 3b illustrates the WAN of FIG. 3a with a failure occurring along one of the dual lines between router nodes of the two LANs of the WAN.

In step 100, the re-routed process which detected a failure along a remote network responds also by adding a host route into its node's route table, but note that this entry thereafter permits redirecting of messages around the failure in the remote configuration. In other words, this host route is directed to a remote host (i.e., a remote node) and, thus, in contrast to the local host route discussed in the preceding paragraph, the entry formed by step 100 may be characterized as a remote host route. To further illustrate this point, note that FIG. 3b illustrates once again illustrates WAN 20 in the identical manner of FIG. 3a, but further adds an illustration of a failure F2 along line L2. Given the above steps and considering node A by way of example, one skilled in the art will appreciate that node A will fail to receive, within its timeout interval, a heartbeat packet from IP address 10.5.9.1 of node C and also from IP address 10.5.9.2 of node D. Thus, for each of these detected failures step 100 will repeat (with such repetition including steps 88, 94, and 96 as well) and for each repetition the re-routed process will modify node A's route table to include a remote host route which permits redirection of information to the dual communication path and thereby to circumvent the detected failure. To appreciate this effect, the two different transmitting addresses (i.e., 10.5.9.1 and 10.5.9.2) are each discussed below. In either event, however, note that after step 100, method 50 returns to step 90 to proceed in the manner described above.

FIG. 5c illustrates the modification to node A's route table based on a first instance of step 100 and as directed to the detected failure from IP address 10.5.9.1 of node C. Looking to FIG. 5c, note that a remote host route is created at the top of the route table, where the portion to the left of the entry specifies the IP address detected by step 88 as having failed to send a timely heartbeat packet within the timeout interval. To redirect future communications as further appreciated below, the right portion of the remote host route indicates the redundant router node, that is, the router node which is connected to the still-operational communications path to node C. More particularly as to this right portion of the remote host route, note from FIG. 3b that an attempt to communicate from node A to node C across router RTR2 would be futile since line L2 has failed. However, a redundant path still exists via router RTR1 and across line L1 whereby communication may still occur from node A to node C. Thus, the right portion of the remote host entry in FIG. 5c specifies router RTR1, thereby providing future guidance for transmission from node A to node C across router RTR1 rather than across router RTR2. Having understood the remote host route entry, note also how that it differs from the local host route entry in two respects. First, its left portion is directed to a remote IP address rather than a local IP address. Second, its right portion, rather than being directed to an interface of node A itself, is instead directed to a router where that router has an interface connected to the same local network as is node A (i.e., N1) and has an additional interface connected to the desired destination remote network. Lastly, consider the effect of the remote host route in FIG. 5c for a subsequent communication from node A to IP address 10.5.9.1 of node C. Specifically, when node A desires to transmit a packet to IP address 10.5.9.1, it consults its route table and is directed to use router RTR1. Note that this host route supersedes the effect of the remote network route shown at the second from the bottom entry of FIG. 5c (i.e., 10.5.9.0 use RTR2 (10.5.8.3)). Thus, when the packet is transmitted, it is sent via router RTR1 rather than router RTR2.

FIG. 5d illustrates the modification to node A's route table based on a second instance of step 100 and as directed to the detected failure from IP address 10.5.9.2 of node D. This modification should be fairly straightforward having examined in the preceding paragraph the modification shown in FIG. 5c. Turning to FIG. 5d, note that a second remote host route is created at the top of the route table. Again, the portion to the left of the remote host route specifies the IP address detected by step 88 as having failed to timely send a heartbeat packet while the right portion indicates the router node which is connected to the still-operational communications path to node D. From FIG. 3b, note now that an attempt to communicate from node A to node D across router RTR2 would be futile since line L2 has failed, but again a redundant path still exists via router RTR1 and across line L1. Thus, the right portion of the remote host entry specifies router RTR1, thereby providing future guidance for transmission from node A to node D across router RTR1 rather than across router RTR2.

Figure 3C:
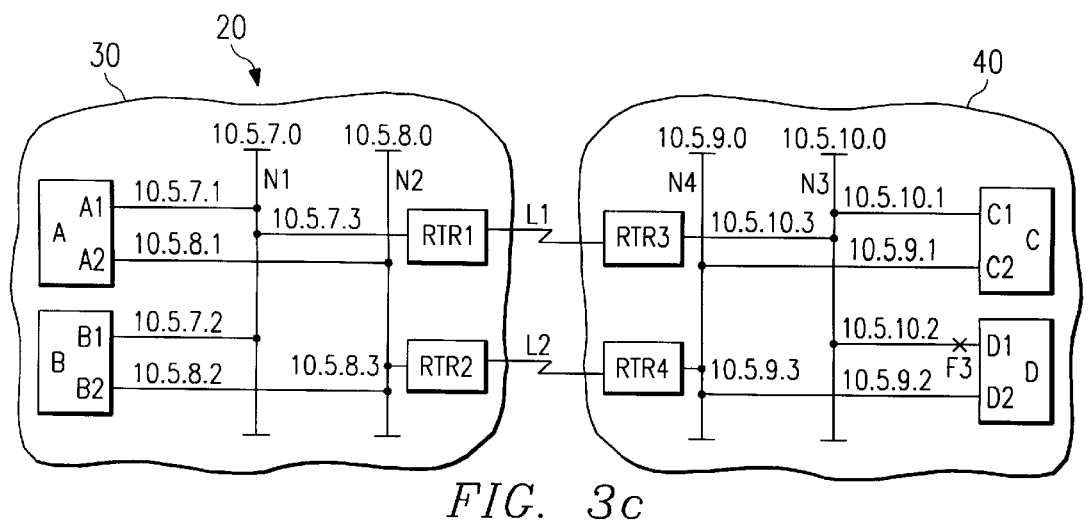
FIG. 3c illustrates the WAN of FIG. 3a with a failure occurring along one of the dual networks within one of the two LANs of the WAN.

To further illustrate the capability of the present embodiment in the context of redundant communication between remote networks, FIGS. 3c and 5e illustrate another failure scenario which is contemplated within the inventive scope and for which the flow chart of FIGS. 4, 6, and 7 also provide corrective action to permit communication along the redundant medium upon detection of the failure. Specifically, FIG. 3c once again illustrates LAN 20 from FIG. 3a, but in this instance a failure is located within LAN 40 as shown by the "X" designated at F3 as opposed to a failure between routers as is the case in FIG. 3b. Without re-stating the detail provided for earlier examples, note in the context of node A that the location of failure F3 in FIG. 3c will cause node A to no longer receive heartbeat packets from IP address 10.5.10.2 of node D. However, in contrast to FIG. 3b, note that node C is still fully able to communicate from either of its interfaces to node A. Returning to the communication failure with respect to node D, note that the re-routed process of node A will modify node A's route table as shown in FIG. 5e in response to detection of the failure, that is, once the re-routed process determines that node A has not timely received a heartbeat packet due to the failure. Specifically, the top entry in FIG. 5e depicts the modification, which is the creation of a remote host route. Again, the left portion of the remote host route identifies the IP address which did not transmit a timely heartbeat packet. Also, the right portion of the remote host route identifies the router which provides connection to the remaining operational path to the node which failed to send the timely heartbeat packet. One skilled in the art will appreciate that given the remote host route of FIG. 5e, future communications from node A to the IP address 10.5.10.2 of node B will be via router RTR2 rather than router RTR1 as would be the case if the remote network route of the table were used.

Turning now to steps 102 through 110 as they pertain to supplying heartbeat packets to local and remote networks, in step 102 the re-routed process determines whether the supply interval has expired. In the preferred embodiment, this step is accomplished in a manner similar to step 86 as it pertained to the timeout interval, but here the concern is the supply interval; thus, step 102 is accomplished by subtracting from the current time the time at which the last supply packet was transmitted by the node (where that time has been stored as appreciated in step 108 described below), and then evaluating whether the result exceeds the supply interval. For example, assume the last time a heartbeat packet was transmitted by the node was at 12:15:40, and that step 102 is reached at 12:15:45. Consequently, step 102 determines that 5 seconds have elapsed, and this is less than the supply interval of 25 seconds. In this case, it is not yet time to transmit another set of heartbeat packets and thus method 50 continues to step 110. On the other hand, if the current time is more than 25 seconds later than when the last heartbeat packet was transmitted by the node, then method 50 continues to steps 104 through 108.

In step 104 the re-routed process issues heartbeat packets in the same manner as the prior art described earlier. Thus, heartbeat packets are issued to each local network corresponding to each of the interfaces of the node. Looking again to node A by way of example, recall from FIGS. 5a–b that node A includes interfaces A1 and A2 and, thus, step 104 issues heartbeat packets to the networks (i.e., N1 and N2) connected to those interfaces.

In step 106 the re-routed process issues additional heartbeat packets, but importantly note that these packets are directed to remote networks rather than local networks as is the case for step 104. Specifically, in step 106 each node issues heartbeat packets to each remote network identified in step 56 (i.e., those identified in the re-routed.des descriptor file). Using node A by way of example, recall from above that the re-routed process of node A identified remote networks 10.5.9.0 and 10.5.10.0 in step 56. Thus, step 106 issues heartbeat packets to those remote networks. Note that, like the issuance of a heartbeat packet to a local network, the issuance of a heartbeat packet to a remote network is also by way of a broadcast message. Thus, node A issues a heartbeat packet to an IP destination address of 10.5.9.255 to be received by all remote nodes on network 10.5.9.0, and it also issues a heartbeat packet to an IP destination address of 10.5.10.255 to be received by all remote nodes on network 10.5.10.0. In order to issue these broadcast remote heartbeat packets, note further that node A consults its route table and uses the remote network routes obtained by the RIP process (e.g., the bottom two entries in FIG. 5b). As an example, for node A to issue the broadcast heartbeat packet to remote network 10.5.10.0, it is informed by the bottom entry in FIG. 5b that such a message must be sent by way of router RTR1. Moreover, because router RTR1 corresponds to an IP address of 10.5.7.3, then from the top entry in its route table node A is informed to issue the broadcast heartbeat packet by way of its A1 interface. One skilled in the art will appreciate the comparable considerations for the issuance by node A of a heartbeat packet to remote network 10.5.9.0. Lastly, note that step 106 only occurs if remote networks have been identified. Otherwise, the step is skipped. In either event, therefore, method 50 next continues to step 108.

In step 108 the re-routed process records a time stamp of the current time which provides a supply time stamp as a basis for comparison for the next occurrence of step 102. In other words, this supply time stamp is then available for the next occurrence of step 102 to determine whether the supply interval has once again expired so that additional heartbeat packets may be issued.

Step 110 concludes method 50, and is achieved-by the re-routed process resetting the interrupt timer which provided the interrupt of step 84. In other words, by resetting this timer, it may once again begin advancing toward some limit which is below the limits of both the supply and timeout intervals. Of course, when this timer once again reaches its limit, an interrupt is generated from which method 50 may again leave the wait state of step 62 in FIG. 4 and continue to step 84 and the successive steps described above.

From the above, it may be appreciated that the above embodiments provide numerous advantages, and are considerably beneficial when contrasted to the prior art. Many of these advantages and benefits have been noted above, and still others will be ascertainable by one skilled in the art. As still another benefit, while the preceding describes various aspects of the preferred embodiment, note that various substitutions, modifications or alterations could be made to the descriptions set forth above without departing from the inventive scope. For example, while the above nodes illustrate the use of only two media connected to each node, note that additional interfaces could be included between certain nodes whereby more than one redundant path is formed and, thus, allow redirecting of messages to any of these multiple redundant media. As another example, while the preferred host stations above Sun stations using UNIX, both a different type of station and a different type of operating system may implement the present approach. As yet a final example, one skilled in the art may adapt various of the present teachings to a network medium other than Ethernet. Thus, these examples as well as others ascertainable by one skilled in the art may be included within the inventive scope, which is defined by the following claims.

What is claimed is:

1. A communications configuration, comprising:
   a first network medium having a first IP address;
   a second network medium having a second IP address;
   a first host station, comprising:
      a first interface connected to communicate with the first network medium using the first IP address;
      a second interface connected to communicate with the second network medium using the second IP address;
   a third network medium having a third IP address;
   a fourth network medium having a fourth IP address;
   at least a first router station coupled between the first network medium and the third network medium;
   at least a second router station coupled between the second network medium and the fourth network medium; and
   a second host station, comprising:
      a first interface connected to communicate with the third network medium using the third IP address;
      a second interface connected to communicate with the fourth network medium using the fourth IP address; and
      memory programmed to perform the steps of:
         detecting a communications failure along a first communication path including the first interface of the first host station, the first network medium, the first router station, the third network medium, and the first interface of the second host station; and
         responsive to the detected failure, redirecting communications addressed to pass from the second host station to the first host station to pass along a second communication path from the second host station to the first host station such that redirected communications are not attempted by the second host station to the first host station along the first communication path.

2. The communications configuration of claim 1 wherein the second communication path comprises the second interface of the second host station, the fourth network medium, the second router station, and the second interface of the first host station.

3. The communications configuration of claim 2 wherein the memory is further programmed to perform the steps of:
   detecting a communications failure along the second communication path; and
   responsive to the detected failure along the second communication path, and having not detected a communications failure along the first communication path, redirecting communications addressed to pass from the second host station to the first host station along the first communication path.

4. The communications configuration of claim 1:
   wherein the second host station is remote from the first network medium and the second network medium in that the second host station consists of a plurality of interfaces for communicating to corresponding network media;
   wherein the plurality of interfaces include the first interface connected to communicate with the third network medium and the second interface connected to communicate with the fourth network medium; and
   wherein none of the plurality of interfaces has a network address equal to either the first IP address or the second IP address.

5. The communications configuration of claim 1 wherein the redirecting step is responsive to a route table accessible by the memory.

6. The communications configuration of claim 5:
   wherein the route table comprises a plurality of remote host route entries; and
   wherein each of the plurality of remote host route entries comprises:
      an IP address of a remote host station; and
      an identifier of a router station coupled to communicate with the remote host station.

7. The communications configuration of claim 1 wherein the first host station further comprises a memory programmed to read a file comprising a plurality of remote network identifiers.

8. The communications configuration of claim 7:
   wherein the file further comprises a plurality of router station identifiers corresponding to the plurality of remote network identifiers; and
   wherein each of the plurality of router station identifiers identifies a router station directly connected to the first host station and through which a communication may be passed to a remote network identified by the corresponding one of the plurality of the remote network identifiers.

9. The communications configuration of claim 8 wherein the first host station further comprises a memory programmed to perform the step of periodically transmitting a heartbeat packet to each remote network identified by a corresponding remote network identifier in the file.

10. The communications configuration of claim 9:
    wherein the memory of the second host station is further comprised to perform the step of monitoring receipt of each heartbeat packet from the first host station; and
    wherein the step of redirecting communications by the second host station is responsive to detecting a failure to receive a heartbeat packet from the first host station within a timeout interval.

11. The communications configuration of claim 10 wherein the step of monitoring receipt of each heartbeat packet from the first host station comprises:
    forming an internal timing table accessible by the second host station;
    responsive to receipt of a heartbeat packet, updating an entry in the internal timing table by entering a time stamp representative of a time when the heartbeat packet is received by the second host station.

12. The communications configuration of claim 11 wherein the step of detecting a failure to receive a heartbeat packet from the first host station comprises calculating a time difference by comparing a present time to the time stamp and determining that the time difference exceeds the timeout interval.

13. The communications configuration of claim 1:
    wherein the memory of the second host station is further programmed to execute one or more applications programs; and
    wherein the detecting and redirecting steps are transparent to the one or more applications programs.

14. The communications configuration of claim 1 wherein each of the first, second, third, and fourth network media is an Ethernet medium.

15. The communications configuration of claim 1 wherein the first station further comprises a memory programmed to perform the steps of:
   detecting a communications failure along a third communication path including the first interface of the second host station, the third network medium, the first router station, the first network medium, and the first interface of the first host station; and
   responsive to the detected failure along the third communication path, redirecting communications addressed to pass from the first host station to the second host station to pass along a fourth communication path from the first host station to the second host station such that redirected communications are not attempted by the first host station to the second host station along the third communication path.

16. The communications configuration of claim 1:
   and further comprising:
      a plurality of local network media including the first and second network media;
      a plurality of remote network media including the third and fourth network media;
      a plurality of router stations including the first and second router stations, wherein each of the plurality of router stations is coupled between one of the plurality of local network media and a corresponding one of the plurality of remote network media; and
   wherein the first host station further comprises:
      a plurality of interfaces including the first and second interface, wherein each of the plurality of interfaces is connected to communicate with a respective one of the plurality of local network media and using a respective IP address; and
      a memory programmed to perform the steps of:
         detecting a communications failure along a first remote communication path including a first one of the plurality of router stations, the respective one of the plurality of remote network media to which the first one of the plurality of router stations is coupled, and a first interface of a remote destination host station coupled to communicate with the respective one of the plurality of remote network media; and
         responsive to the detected failure along the first remote communication path, redirecting communications from the first host station to the remote destination host station along a second remote communication path such that redirected communications are not attempted by the first host station along the first remote communication path, wherein the second remote communication path includes a second one of the plurality of router stations, the respective one of the plurality of remote network media to which the second one of the plurality of router stations is coupled, and the second interface of the remote destination host station.

17. The communications configuration of claim 1 wherein the memory of the second host station is further programmed to perform the steps of:
   detecting a re-established communication along the first communication path after the step of detecting the failure; and
   responsive to the re-established communication, permitting communications from the second host station to the first host station to occur along the first communication path.

18. A communications configuration, comprising:
   a plurality of local network media;
   a plurality of local host stations, each comprising:
      a first interface connected to communicate with at least one of the plurality of local network media using an IP address corresponding to the at least one of the plurality of local network media; and
      a second interface connected to communicate with another of the plurality of local network media using an IP address corresponding to the another of the plurality of local network media; and
   a plurality of remote network media;
   a plurality of remote host stations, each comprising:
      a first interface connected to communicate with at least one of the plurality of remote media using an IP address corresponding to the at least one of the plurality of remote network media;
      a second interface connected to communicate with another of the plurality of remote media using an IP address corresponding to the another of the plurality of remote network media;
   a plurality of router stations, wherein each of the plurality of router stations is coupled between one of the plurality of local network media and a corresponding one of the plurality of remote network media; and
   wherein at least one the plurality of local host stations further comprises a memory programmed to perform the steps of:
      detecting a communications failure along a first remote communication path including a first one of the plurality of router stations, the respective one of the plurality of remote network media to which the first one of the plurality of router stations is coupled, and a first interface of one of the plurality of remote host stations coupled to communicate with the respective one of the plurality of remote network media; and
      responsive to the detected failure along the first remote communication path, redirecting communications from the at least one of the plurality of local host stations to the one of the plurality of remote host stations along a second remote communication path such that redirected communications are not attempted by the at least one of the plurality of local host stations along the first remote communication path.

19. The communications configuration of claim 18 wherein the second remote communication path includes a second of the plurality of router stations, the respective one of the plurality of remote network media to which the second of the plurality of router stations is coupled, and a second interface of the one of the plurality of remote host stations.

20. A first host station, comprising:
   a first interface for connecting to a first network medium;
   a second interface for connecting to a second network medium;
   wherein the first network medium is further coupled through a first router station to communicate with a third network medium, and wherein the third network medium is further coupled to communicate with a second host station via a first interface of the second host station connected to the third network medium; and memory programmed to perform the steps of:
  detecting a communications failure along a first communication path including the first interface of the first host station, the first network medium, the first router station, the third network medium, and the first interface of the second host station; and
  responsive to the detected failure, redirecting communications addressed to pass from the first host station to the second host station to pass along a second communication path from the first host station to the second host station such that redirected communications are not attempted by the first host station to the second host station along the first communication path.

21. The first host station of claim 20 wherein the redirecting step comprises communicating communications along the second communication path comprising a path through a second interface of the first host station to the second network medium, from the second network medium through a second router station to a fourth network medium, and from the fourth network medium to a second interface of the second host station.

22. The first host station of claim 20 wherein the redirecting step is responsive to a route table accessible by the memory.

23. The first host station of claim 20:
  wherein the memory is further programmed to monitor receipt of periodic heartbeat packets from the second host station; and
  wherein the step of redirecting communications by the first host station is responsive to detecting a failure to receive a heartbeat packet from the second host station within a timeout interval.

24. The first host station of claim 23 wherein the memory is further programmed to perform the steps of:
  forming an internal timing table accessible by the first host station; and
  responsive to receipt of a heartbeat packet, updating an entry in the internal timing table by entering a time stamp representative of a time when the heartbeat packet is received by the first host station.

25. The first host station of claim 24 wherein the step of detecting a failure to receive a heartbeat packet from the second host station comprises calculating a time difference by comparing a present time to the time stamp and determining that the time difference exceeds the timeout interval.

26. The first host station of claim 25 wherein the memory is further programmed to read a file comprising a plurality of remote network identifiers, wherein one of the plurality of remote network identifiers identifies the third network medium.

27. The first host station of claim 26 wherein the memory is further programmed to perform the step of periodically transmitting a heartbeat packet to each remote network identified by a corresponding remote network identifier in the file.

28. A method of operating a first host station to communicate with a second host station, comprising the steps of:
  communicating a first packet from the first host station through a first interface of the first host station to a first network medium, wherein the first packet is further communicated from the first network medium through a first router station to a second network medium, and from the second network medium to a first interface of the second host station;
  detecting a communications failure along a first communication path including the first interface of the first host station, the first network medium, the first router station, the second network medium, and the first interface of the second host station; and
  responsive to the detected failure, redirecting communications addressed to pass from the first host station to the second host station to pass along a second communication path from the first host station to the second host station such that redirected communications are not attempted by the first host station to the second host station along the first communication path.

29. The method of claim 28 wherein the redirecting step comprises communicating a second packet along the second communication path comprising a path from a second interface of the first host station to a third network medium, from the third network medium through a second router station to a fourth network medium, and from the fourth network medium to a second interface of the second host station.

30. The method of claim 28 and further comprising the steps of:
  detecting a communications failure along the second communication path; and
  responsive to the detected failure along the second communication path, and having not detected a communications failure along the first communication path, redirecting communications addressed to pass from the first host station to the second host station along the first communication path.

31. The method of claim 28 and further comprising the step of operating the first host station to read a route table, wherein the redirecting step is responsive to the route table.

32. The method of claim 28 and further comprising the step of monitoring receipt of periodic heartbeat packets from the second host station, wherein the step of redirecting communications by the first host station is responsive to detecting a failure to receive a heartbeat packet from the second host station within a timeout interval.

33. The method of claim 32 and further comprising the steps of:
  forming an internal timing table accessible by the first host station; and
  responsive to receipt of a heartbeat packet, updating an entry in the internal timing table by entering a time stamp representative of a time when the heartbeat packet is received by the first host station.

34. The method of claim 33 wherein the step of detecting a failure to receive a heartbeat packet from the second host station comprises calculating a time difference by comparing a present time to the time stamp and determining that the time difference exceeds the timeout interval.

35. The method of claim 34 and further comprising the step of reading a file comprising a plurality of remote network identifiers, wherein one of the plurality of remote network identifiers identifies the second network medium.

36. The embodiment of claim 35 and further comprising the step of periodically transmitting a heartbeat packet to each remote network identified by a corresponding remote network identifier in the file.

* * * * *